United States Patent [19]

Kekish et al.

[11] Patent Number: 4,470,827

[45] Date of Patent: Sep. 11, 1984

[54] FREEZE CONDITIONING COMPOSITION AND METHOD

[75] Inventors: George T. Kekish, Naperville; Carol B. Batton, Bartlett, both of Ill.

[73] Assignee: Nalco Chemical Company, Oak Brook, Ill.

[21] Appl. No.: 331,558

[22] Filed: Dec. 17, 1981

[51] Int. Cl.$^3$ ............................ C01L 5/32; C09K 3/18
[52] U.S. Cl. ........................................... 44/6; 252/70; 427/220
[58] Field of Search ................. 44/6; 252/70; 427/220

[56] References Cited

U.S. PATENT DOCUMENTS

| | | | |
|---|---|---|---|
| 3,298,804 | 1/1967 | Schoch | 44/6 |
| 3,350,314 | 10/1967 | Dawtrey et al. | 252/70 |
| 3,794,472 | 2/1974 | Macaluso et al. | 44/6 |
| 4,117,214 | 9/1978 | Parks et al. | 427/220 |
| 4,225,317 | 9/1980 | Kugel | 44/6 |
| 4,254,166 | 3/1981 | Glanville et al. | 427/220 |
| 4,264,333 | 4/1981 | Shaw et al. | 44/6 |
| 4,410,431 | 10/1983 | Roe | 44/6 X |

*Primary Examiner*—Carl F. Dees
*Attorney, Agent, or Firm*—Joan I. Norek; John G. Premo; Robert A. Miller

[57] ABSTRACT

The present invention provides freeze conditioning compositions for reducing moisture freezing problems found with moisture containing particulate solids, such as coal and ores and the like, comprising an alkylene polyol, such as ethylene glycol, and an effective amount of a cationic surface active material, preferably such cationics with at least one hydrophobic moiety. The preferred cationics are those with HLB of at least 11 or cationic compounds containing at least 18 total carbons, and those that are quaternary ammonium salts.

The present invention also provides methods of reducing such moisture freezing problems comprising applying to at least some of the surfaces of moisture-containing particulate solids a composition comprising an alkylene polyol and an effective amount of a cationic surface active material.

24 Claims, No Drawings

FREEZE CONDITIONING COMPOSITION AND METHOD

TECHNICAL FIELD OF THE INVENTION

The present invention is in the technical field of freeze conditioning compositions for moisture-containing particulate solids and methods of treating such solids with such compositions. More particularly, the present invention is a composition for, and a process for, reducing the cohesive strength of and between moisture-containing particulate solids when such solids are subjected to freezing conditions.

BACKGROUND OF THE INVENTION

Moisture present on particulate solids, such as coal, mineral ores, and other finely divided solids, causes serious problems when such solids are shipped or stored under low temperature or freezing conditions. When the moisture freezes, the ice thus formed acts as a powerful adhesive, binding the particles to each other and often to the sides of their container, if any, such as rail road car walls. For example, a rail road car of coal can be bound into a solid mass by the frozen moisture, which mass may even be adhered to the car itself, causing obvious serious problems in unloading. As further example, such particulate solids, if stored outside in piles during cold weather, may be frozen together by the freezing of the moisture, requiring breaking up before use, or transport to the site of use.

Both physical and chemical methods have been used to alleviate the problem, either by preventing or reducing such moisture freezing or as means to reduce the size of the frozen masses. Vibration and dynamiting have been used. Heating by means of fires, steam, and infra red heating have been used. These methods generally present safety problems and are uneconomic. Further, they are often ineffective or totally impractical when the freezing is severe.

As for chemical methods, sodium and calcium salts have been added to moisture-containing coal with some degree of success toward reducing the freezing problem. Such salts, however, contribute to the corrosion of all equipment contacted by the treated solids, and when used with coking coal are detrimental to the coking process. Thus this form of chemical treatment is lacking.

In U.S. Pat. No. 3,794,472 it has been disclosed that coal particle freezing problems are prevented by coating either the coal particles and/or the surfaces of their storage container with a composition comprising a hydrocarbon liquid which has emulsified therewith an aqueous solution of a polyhydric alcohol. In U.S. Pat. No. 3,298,804 the surface treatment of coal particles to prevent freezing problems with a composition of a liquid hydrocarbon and a surface-active composition in the class of substituted imidazolines is disclosed.

Ethylene glycol, generally admixed with water, also has been used for coating coal particles to reduce freezing problems. In comparison to salt treatment, ethylene glycol treatment is more expensive, but eliminates contribution to corrosion, presents no safety problems, and has no deleterious effects on the use of the coal so treated. Ethylene glycol based compostions, moreover generally are less expensive than hydrocarbon based compositions, but when applied at maximum levels considered commensurate with economic practicalities, its performance is disappointing.

There is a need for freeze conditioning compositions for treating finely divided particulate solids, such as coal, ores, and other such solids that contain moisture, to overcome the freeze problems in transportation and storage, that are more effective then ethylene glycol while at least in the same cost range as ethylene glycol.

DISCLOSURE OF THE INVENTION

The present invention provides, as a freeze conditioning composition for moisture-containing particulate solids, a composition comprising a combination of an alkylene polyol, such as ethylene glycol and other polyols, and an effective amount of a cationic surface active material.

The present invention also provides a method or process of treating moisture-containing particulate solids, such as coal, ores, and other finely divided solids, to reduce the moisture freezing problems, to reduce the cohesive strength of and between such particles when frozen, which comprises applying to at least some of the surfaces of such particles such alkylene polyol and an effective amount of a cationic surface active material. A convenient manner of applying such composition to such particles is to spray it into the particles when being loaded into a railway car, truck or the like, or while being piled for storage. This can be done while the particles are on a conveyor or while falling into the transport or pile.

The preferred cationic surface active materials include cationic compounds having at least one hydrophobic moiety, which is discussed in more detail below.

The ratio of alkylene polyol to cationic surface active material found suitably effective is about 0.25 weight percent or higher cationic surface active material based on total weight of alkylene polyol. The upper limit of cationic surface active material to polyol is controlled by economic considerations. Particularly for the preferred cationics discussed below, an upper limit of about 5.0 weight percent cationic surface active material based on total weight of alkylene polyol is cost efficient, while 2.0 to 3.0 weight percent same basis provides extremely suitable effectiveness.

The compositions are normally admixed with water and applied as such admixtures.

PREFERRED EMBODIMENTS OF THE INVENTION

The freeze conditioning composition of the present invention is a combination of an alkylene polyol, such as ethylene glycol, and cationic surface active material which composition, when applied to at least some of the surfaces of moisture-containing particulate solids, such as coal, ores and the like, reduces the cohesive strength of and between such solids when the moisture freezes.

A typical composition may contain 50 weight percent ethylene glycol, 1.0 weight percent cationic surface active material, the remainder being water, and be applied at a level of about two pints per ton of solid particles being treated. Such compositions are dramatically more effective at same use levels than 50 weight percent ethylene glycol compositions, which for ethylene glycol compositions is generally a economic maximum use level. The compositions of the present invention are even more effective than ethylene glycol at significantly higher use level.

The level of cationic surface active material can be lower than the typical 1.0 weight percent, and the level chosen is dependant on a variety of factors, such as the type of particulate solid to be treated, its moisture content, the temperature conditions the solid will be subjected to, and in some instances the particular cationic surface active material selected.

It is believed that, taking coal as an example, the particles differ in their requirements for freeze conditioning compositions depending on the source of the coal, its particle size distribution, and its moisture content. A freeze conditioning composition effective for some coals may need reformulation to maintain the same level of effectiveness for other coals. Further, the levels of ethylene glycol and cationic surface active material may be adjusted to obtain optimum economic effectiveness given the temperature conditions to which the coal will be subjected. With all these variables, it is obvious that routine experiments may be required to determine optimum formulations and dosages in some particular cases.

Preferred cationic surface active materials are those cationics containing at least one hydrophobic moiety. By at least one hydrophobic moiety is herein meant a radical or radicals that, when considered apart from the rest of the molecule, have hydrophobic characteristics. The most common of such moieties, for example but without limitation, are alkylene oxide condensation radicals, particularly when condensed to nitrogen, alkyl radicals, benzyl radicals, alkyl benzyl radicals, alkenyl radical, alkynyl radicals, alkyloxy radicals, and the like. More exotic hydrophobic moieties can be found in cationic surface active material of the present invention, even those substituted with hydrophilic substituents, as long as the overall moiety retains its hydrophobic characteristic. Such cationics generally would be cost prohibitive for the composition when used for coal freeze conditioning but may find economic practicality in specialized uses.

It has been found that the preferred cationic surface active materials generally have hydrophile-lipophile balances (HLB) as determined by the Atlas HLB guide, or by comparison therewith, of at least 11. It is not found that such HLB characteristic alone determines the effectiveness of a surface active material in combination with an alkylene polyol. Surfactants that are not cationic may have such HLB, and yet cannot be substituted for the cationic surface active materials used in the composition of the present invention.

Preferred cationic surface active materials include alkylene oxide condensates of nitrogen containing compounds, such as ethylene and propylene oxide condensates of tertiary amines and quaternary ammonium salts, and such compounds further including at least one higher alkyl radical; and tertiary amines and quaternary ammonium salts containing higher alkyl radicals, benzyl radicals, alkylbenzyl radicals, and the like. By higher alkyl radical is meant an alkyl radical having at least 8 carbons.

These preferred cationic surface active materials include ethylene and propylene oxide condensates of fatty amines; alkylene oxide fatty alkyl methyl quaternary ammonium salts; $C_{14}$-$C_{22}$ alkyl trimethyl quaternary ammonium salts; $C_8$-$C_{18}$ dialkyl dimethyl quaternary ammonium salts; $C_{12}$-$C_{18}$ alkyl, $C_0$-$C_2$ alkylbenzyl dimethyl quaternary ammonium salts; and the like. Such preferred cationic surface active materials have been found effective in the composition of the present invention.

Where only one hydrophobic moiety is present in a surface active material, and that moiety is an alkyl radical, it preferred that such radical have at least 14 carbons, and more preferably, at least 16 carbons.

The preferred cationic surface active materials for the composition of the present invention can also be defined as those having at least about 18 total carbons. Where such cationics are of the type having simple radicals such as alkyl, benzyl, alkylbenzyl and the like, a range of total carbons of about 18 to about 36 is considered even more preferred. Where such cationics include alkylene oxide units, it is preferred that the number of alkylene oxide units be in an intermediate range of about 2 to about 12, and when higher alkyl is also present, in a narrower range of about 2 to about 10 units, to avoid long alkylene oxide chains of hydrophilic character.

Even more preferred are quaternary ammonium salts within above defined categories.

The alkylene polyol and cationic surface active material are preferably admixed with water to a practical dilution, such as about 20 to about 70 weight percent water based on toal composition including water. Compositions containing about 35 to about 60 weight percent water are generally considered more preferred. The alkylene polyol and cationic surface active material should of course preferably disperse at least in the water to form a uniform composition.

Alkylene polyols useful for the present invention include ethylene glycol, glycerine, pentaerythritol, 1,2 propylene glycol, 1,3-propylene glycol, and the like. Of such alkylene polyols, ethylene glycol is preferred due to its commercial availability and low cost.

The compositions of the present invention were shown effective in reducing freezing problems of moisture-containing particulate solids and reducing the cohesive forces between such solids when such solids were stored at freezing temperatures by measuring unconfined compression strengths, as follows. Coal samples of 1000 grams each having particle size less than or equal to ½ inch are collected by screening coal through a ½ inch mesh screen, and then riffling the screened coal into the correct weight samples. Each 1000 gram sample is placed in a separate one gallon plastic jar and covered to prevent moisture change. Freeze conditioning compositions are sprayed onto the coal samples using an air-atomizing nebulizer while the jars are being rolled on a laboratory scale jar roller, causing the coal particles within to tumble while being so treated. Each coal sample is then transferred to a plastic cylinder (2⅝ inch internal diameter by 3¾ inch length), shaken with a mechanical vibrator to ensure packing uniformity, and stored at 0° Farenheit for a consistent period of time for a given test, usually about 16 to 24 hours. The coal samples are then removed and their unconfined compression strengths are measured using a Soiltest Model #CT-4054 Compression Strength Tester.

The more effective the freeze conditioning treatment, the lower is the unconfined compression strength within a given test. In all instances, the treated samples were tested together with a blank, a like sample subjected to the same conditions to which no freeze conditioning composition was applied. The test results for each composition are reported as percent reduction in unconfined compression strength, comparing the unconfined compression strength of the treated sample with that of the blank.

EXAMPLES 1–8

A variety of compositions of the present invention, each containing 49.5 weight percent ethylene glycol, 1.0 weight percent of a cationic surface active material, the remainder being water, were prepared and tested for freeze conditioning effectiveness using an Eastern bituminous coal having a 9.5% moisture level. The compositions were applied at a level of 2 pints per ton of coal. The cationic surface active materials utilized in these examples typify various categories of cationics as described below in Table I.

TABLE I

| Example | Cationic Type | Commercial Name | HLB |
|---|---|---|---|
| 1 | polypropoxy quaternary ammonium salt (M. Wt. about 1600) | Emcol CC-36[1] | 8–10 |
| 2 | tertiary amine, ethylene oxide condesate of $C_{12}$ primary amine | Ethomeen 2 s/15[2] | 4.5 |
| 3 | polyethoxylated fatty alkyl quaternary ammonium salt | Ethoquad C/12[2] | 11.2–19.2 |
| 4 | n-$C_{16}$ alkyl trimethyl quaternary ammonium salt | Arquad 16-29[2] | 15.8 |
| 5 | polypropoxy quaternary ammonium salt (M. Wt. about 600) | Emcol CC-9[1] | 12–14 |
| 6 | $C_8$—dialkyl dimethyl quaternary ammonium salt | Bardac LF[3] | — |
| 7 | $C_{13}$—alykyl benzyl dimethyl quaternary ammonium salt | Barquat MB-80[3] | 20 |
| 8 | (coco) dialkyl dimethyl quaternary ammonium salt | Arquad 2C-75[2] | 11.4 |

[1]Witco Chemical Company;
[2]Armak Industrial Chemical Division of Armour Company;
[3]Lonza Inc.

The following Table II sets out the test results for each example in terms of percentage reduction in unconfined compression strength as compared to the blank.

TABLE II

| Example | Percent Reduction in Unconfined Compression Strength |
|---|---|
| 1 | 4.2 |
| 2 | 9.2 |
| 3 | 11.1 |
| 4 | 15.4 |
| 5 | 17.2 |
| 6 | 17.7 |
| 7 | 17.7 |
| 8 | 18.5 |

All compositions tested in Examples 1 through 8 were found to reduce unconfined compression strength as compared to the blank. The preferred compositions, having reduced unconfined compression strengths by 15 or more percent, are here shown to have superior freeze conditioning effectiveness.

In the test set forth above as Examples 1 to 8, a 50/50 ethylene glycol/water composition reduced unconfined compression strength by a mere 1.7 percent.

EXAMPLES 9–11

The same test as described above for Examples 1 to 8 was conducted substituting an Eastern Bituminous coal having a 10.8% moisture level, using compositions within the present invention. The results are shown below in Table III.

TABLE III

| Example | Composition Cationic | Percent Reduction in Unconfined Comp. Strength |
|---|---|---|
| 9 | Arquad 16–29 | 24.3 |
| 10 | Bardac LF | 18.9 |
| 11 | Barquat 4250-Z[4] | 17.9 |

[4]a mixture of $C_{12-18}$ alkyl benzyl dimethyl quaternary ammonium salts and $C_{12-14}$ alkyl ethylbenzyl dimethyl quaternary ammonium salts, Lonza, Inc., HLB about 20.

In this same test a 50/50 ethylene glycol/water composition reduced unconfined compression strength by only 9 percent.

COMPARATIVE EXAMPLE 12

A freeze conditioning composition containing 50% ethylene glycol, 2% of a mixture of quaternary ammonium salts having an average total carbon of about 22 (Barquat 4250-Z, described above), the remainder being water, was compared to 50/50 and 70/30 ethylene glycol/water compositions, all compositions being applied at a level of 2 pints per ton of coal to an Eastern Bituminous coal have a 9.3% moisture level. The results are shown below in Table IV.

TABLE IV

| COMPOSITION | | | Percent Reduction in |
|---|---|---|---|
| Ethylene glycol | Cationic | Water | Unconfined Comp. Strength |
| 50% | 2% | 48% | 19.8 |
| 70% | none | 30% | 12.8 |
| 50% | none | 50% | 3.4 |

Thus as shown in this example, the presence of a minor amount of cationic surface active material not only increases the freeze conditioning effectiveness of a similar ethylene glycol composition without cationic, but also provides a composition that is more effective than an ethylene glycol composition being applied to the coal at a level of 40% more ethylene glycol. The use of the higher level of ethylene glycol as shown, while being less effective than the composition of the present invention illustrated, would at typical raw material costs be about 25 to about 35 percent more expensive.

In the above descriptions and examples, unless otherwise specified, all percentages are based on weight.

COMMERCIAL APPLICABILITY OF THE INVENTION

The present invention in its compositions and processes and methods is commercially applicable to a variety of industries that ship and store moisture-containing particulate solids, such as the fuel industry which ships and stores coal, and the metal industries that ship and store ores.

The above described particular embodiments of the invention, methods of operation, materials utilized, and combination of elements and components can vary without changing the spirit of the invention, as particularly defined in the following claims.

We claim:

1. A freeze conditioning composition for particulate solids having moisture present thereon, comprising:

an alkylene polyol; and
a cationic surface active material comprising a quaternary ammonium salt having at least one hydrophobic moiety and an HLB rating of at least 11.

2. The freeze conditioning composition of claim 1 wherein said cationic surface active material comprises an alkylene oxide condensate of said quaternary ammonium salt.

3. The freeze conditioning composition of claim 1 wherein said quaternary ammonium salt includes at least one higher alkyl radical.

4. The freeze conditioning composition of claim 1 wherein said quaternary ammonium salt has at least about 18 carbons.

5. The freeze conditioning composition of claim 4 wherein said quaternary ammonium salt is an alkylene oxide fatty alkyl methyl quaternary ammonium salt.

6. The freeze conditioning composition of claim 4 wherein said quaternary ammonium salt is a $C_{14}$–$C_{22}$ alkyl trimethyl quaternary ammonium salt.

7. The freeze conditioning composition of claim 4 wherein said quaternary ammonium salt is a $C_8$–$C_{18}$ dialkyl dimethyl quaternary ammonium salt.

8. The freeze conditioning composition of claim 4 wherein said quaternary ammonium salt is a $C_{12}$–$C_{18}$ alkyl, $C_0$–$C_2$ alkylbenzyl, dimethyl quaternary ammonium salt.

9. The freeze conditioning composition of claim 1 further comprising from about 20 to about 70 weight percent water based on total composition, from about 1 to about 2 weight percent of said quaternary ammonium salt, and the remainder being said alkylene polyol.

10. A method of treating particulate solids to reduce the cohesive strength of such particulate solids when frozen when moisture is present thereon, which comprises:
applying to at least some of the surfaces of said particulate solids prior to freezing an effective amount of a composition comprising an alkylene polyol and a cationic surface active material.

11. The method of claim 10 wherein said cationic surface active material includes a cationic compound having at least one hydrophobic moiety.

12. The method of claim 11 wherein said cationic surface active material includes a cationic compound having an HLB rating of at least 11.

13. The method of claim 11 wherein said cationic surface active material is an alkylene oxide condensate of a tertiary amine.

14. The method of claim 11 wherein said cationic surface active material is a compound containing at least about 18 total carbons.

15. The method of claim 11 wherein said cationic surface active material is a quaternary ammonium salt.

16. The method of claim 15 wherein said quaternary ammonium salt is an alkylene oxide condensate of a quaternary ammonium salt.

17. The method of claim 11 wherein wherein said particulate solids are coal particles.

18. The method of claim 17 wherein said cationic surface active material is an alkylene oxide condensate of a tertiary amine.

19. The method of claim 17 wherein said cationic surface active material is an alkylene oxide fatty alkyl methyl quaternary ammonium salt.

20. The method of claim 17 wherein said cationic surface active material is a $C_{14}$–$C_{22}$ alkyl trimethyl quaternary ammonium salt.

21. The method of claim 17 wherein said cationic surface active material is a $C_8$–$C_{18}$ dialkyl dimethyl quaternary ammonium salt.

22. The method of claim 19 wherein said cationic surface active material is a $C_{12}$–$C_{18}$ alkyl, $C_0$–$C_2$ alkylbenzyl, dimethyl quaternary ammonium salt.

23. The method of claim 19 wherein said composition comprises from about 20 to about 70 weight percent water, from about 1 to about 2 weight percent of said cationic surface active material, and the remainder being said alkylene polyol.

24. The method of claim 23 wherein said composition is applied at a level of about 2 pints per ton of said coal particles.

* * * * *

UNITED STATES PATENT AND TRADEMARK OFFICE
CERTIFICATE OF CORRECTION

PATENT NO. : 4,470,827

DATED : Sept. 11, 1984

INVENTOR(S) : George T. Kekish and Carol B. Batton

It is certified that error appears in the above-identified patent and that said Letters Patent is hereby corrected as shown below:

In column 8, line 32, in Claim 22, the claim reference number "19" should read --17--.

in column 8, line 35, in Claim 23, the claim reference number "19" should read --17--.

Signed and Sealed this

Twenty-sixth Day of February 1985

[SEAL]

Attest:

DONALD J. QUIGG

Attesting Officer

Acting Commissioner of Patents and Trademarks